(12) United States Patent
Fekriasl et al.

(10) Patent No.: US 10,027,217 B2
(45) Date of Patent: *Jul. 17, 2018

(54) CONVERTER AND METHOD OF CONTROLLING A CONVERTER

(71) Applicant: General Electric Technology GmbH, Baden (CH)

(72) Inventors: Sajjad Fekriasl, Stafford (GB); Michael Marc Claude Merlin, Dourdan (FR); Timothy Charles Green, Haywards Heath (GB); Kevin Dyke, Stafford (GB); Francisco Jose Moreno Muñoz, Navarra (ES); Omar Fadhel Jasim, Nottingham (GB); Masoud Bazargan, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/103,792

(22) PCT Filed: Dec. 12, 2014

(86) PCT No.: PCT/EP2014/077647
§ 371 (c)(1),
(2) Date: Jun. 10, 2016

(87) PCT Pub. No.: WO2015/086844
PCT Pub. Date: Jun. 18, 2015

(65) Prior Publication Data
US 2016/0329804 A1  Nov. 10, 2016

(30) Foreign Application Priority Data
Dec. 12, 2013 (EP) ..................................... 13275311

(51) Int. Cl.
*H02M 1/00* (2006.01)
*H02M 7/483* (2007.01)
(Continued)

(52) U.S. Cl.
CPC ................. *H02M 1/00* (2013.01); *H02J 3/36* (2013.01); *H02M 5/458* (2013.01); *H02M 7/483* (2013.01);
(Continued)

(58) Field of Classification Search
CPC ............................... H02M 1/00; H02M 7/797
See application file for complete search history.

(56) References Cited

U.S. PATENT DOCUMENTS

2002/0131285 A1   9/2002  Kawakami
2003/0026111 A1   2/2003  Steimer et al.
(Continued)

FOREIGN PATENT DOCUMENTS

CN   102 281 014 A   12/2011
CN   102281014 A    12/2011
(Continued)

OTHER PUBLICATIONS

Boyd, S., et al., "Convex Optimization," Cambridge University Press, 730 pages, ISBN 978-0-52183378-3 (2004).
(Continued)

*Primary Examiner* — Emily P Pham
(74) *Attorney, Agent, or Firm* — GE Global Patent Operation; Scott R. Stanley

(57) ABSTRACT

In the field of high voltage direct current power transmission networks, a method of controlling a converter that includes at least one converter limb which corresponds to a respective phase of the converter, is described. The method includes obtaining a respective AC current demand phase waveform for each converter limb which the corresponding converter (Continued)

limb is required to track, and a DC current demand which each converter limb is also required to track. The method further determining a limb portion current for each limb portion that the limb portion must contribute to track the corresponding required AC current demand phase waveform and the required DC current demand, and providing a limb portion voltage source for each limb portion to achieve the corresponding limb portion current. The method carrying out mathematical optimization to determine one or more optimal limb portion currents and/or provide optimal limb portion voltage sources.

10 Claims, 4 Drawing Sheets

(51) Int. Cl.
*H02M 5/458* (2006.01)
*H02M 7/797* (2006.01)
*H02J 3/36* (2006.01)
*H02M 7/72* (2006.01)

(52) U.S. Cl.
CPC .............. *H02M 7/72* (2013.01); *H02M 7/797* (2013.01); *H02M 2001/0003* (2013.01); *H02M 2001/0025* (2013.01); *H02M 2007/4835* (2013.01)

(56) References Cited

U.S. PATENT DOCUMENTS

| | | | |
|---|---|---|---|
| 2012/0113699 A1* | 5/2012 | Crookes | H02M 7/483 363/126 |
| 2012/0314466 A1 | 12/2012 | Goerges et al. | |
| 2013/0015796 A1 | 1/2013 | Feichtinger et al. | |
| 2013/0182467 A1 | 7/2013 | Cross et al. | |
| 2013/0279213 A1 | 10/2013 | Saeki et al. | |
| 2016/0315548 A1 | 10/2016 | Jasim et al. | |
| 2016/0329833 A1 | 11/2016 | Jasim et al. | |

FOREIGN PATENT DOCUMENTS

| | | |
|---|---|---|
| EP | 1 253 706 A1 | 10/2002 |
| EP | 2 528 215 A2 | 11/2012 |
| EP | 2 852 019 A1 | 5/2015 |
| GB | 2 516 068 A | 1/2015 |
| GB | 2 519 762 A | 5/2015 |
| GB | 2 518 853 B | 1/2016 |
| WO | WO-2010/145705 A1 | 12/2010 |
| WO | WO-2010/149200 A1 | 12/2010 |
| WO | WO-2011/050847 A1 | 5/2011 |
| WO | WO-2013/000510 A1 | 1/2013 |
| WO | WO-2015/004120 A1 | 1/2015 |
| WO | WO-2015/049072 A1 | 4/2015 |
| WO | WO-2015/063108 | 5/2015 |
| WO | WO-2015/158402 A1 | 10/2015 |

OTHER PUBLICATIONS

Merlin, M.M.C., et al., "Alternate Arm Converter Operation of the Modular Multilevel Converter" Imperial College London, IEEE, 7 pages (2014).
International Search Report and Written Opinion, PCT/EP2014/077647, Alstom Technology Ltd, 10 pages. (dated Apr. 7, 2015).
International Search Report and Written Opinion, PCT/EP2014/077644, Alstom Technology Ltd, 11 pages (dated Apr. 10, 2015).
International Search Report and Written Opinion, PCT/EP2014/077636, Alstom Technology Ltd, 10 pages (dated Feb. 23, 2015).
English-language machine translation of CN 102 281 014, Univ. Zhejiang (Dec. 14, 2011).
European Office Action issued in connection with Corresponding EP Application No. 13275311.2 dated Mar. 17, 2017.
Hartmann, et al.,"Current Control of Three-Phase Rectifier Systems Using Three Independent Current Controllers", IEEE Transactions on Power Electronics, vol. 28, No. 8, pp. 3988-4000, Aug. 2013.

* cited by examiner

CONVERTER AND METHOD OF CONTROLLING A CONVERTER

CROSS-REFERENCE TO RELATED APPLICATIONS

The present application is a National Stage of International Application No. PCT/EP2014/077647, filed Dec. 12, 2014, which claims the benefit of and priority to European Application No. 13275311, filed Dec. 12, 2013, which is incorporated herein by reference in its entirety.

This invention relates to a method of controlling a converter and to such a converter.

In high voltage direct current (HVDC) power transmission networks alternating current (AC) power is typically converted to direct current (DC) power for transmission via overhead lines and/or under-sea cables. This conversion removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance.

The conversion between DC power and AC power is utilized in power transmission networks where it is necessary to interconnect the DC and AC electrical networks. In any such power transmission network, converters are required at each interface between AC and DC power to effect the required conversion; AC to DC or DC to AC.

According to a first aspect of the invention there is provided a method of controlling a converter including at least one converter limb corresponding to a respective phase of the converter, the or each converter limb extending between first and second DC terminals and including first and second limb portions separated by an AC terminal, the method comprising the steps of:

(a) obtaining a respective AC current demand phase waveform for the or each converter limb which the corresponding converter limb is required to track, and a DC current demand which the or each converter limb is also required to track;

(b) determining a limb portion current for each limb portion that the limb portion must contribute to track the corresponding required AC current demand phase waveform and the required DC current demand;

(c) providing a limb portion voltage source for each limb portion to achieve the corresponding determined limb portion current; and (d) carrying out mathematical optimization to determine one or more optimal limb portion currents and/or provide optimal limb portion voltage sources.

Carrying out one or other of the aforementioned mathematical optimization steps, i.e. selecting the best individual limb portion current and/or the best individual limb portion voltage source (with regard to chosen criteria) from a set of available alternatives, allows the AC and DC current demands to be controlled independently of one another, e.g. by a higher level controller.

It also permits variations in the performance of each limb portion to be accommodated while operation of the converter as a whole continues.

For example, in the case of limb portion currents, conventional methods of controlling a converter consider the limb portions to have equal performance characteristics to one another, with the result that the limb portions are always controlled to each provide the same, equal current contribution, irrespective of any changes in the operating performance of a given limb portion.

Meanwhile, in relation to limb portion voltage sources, the method of the invention permits a given limb portion to provide a reduced limb portion voltage source, e.g. if the limb portion suffers damage that degrades its voltage supply performance, while the converter continues to operate.

Preferably carrying out mathematical optimization includes creating an equivalent converter configuration which represents a corresponding one of the flow of current through the converter and/or voltage conditions in the converter.

Creating an equivalent converter configuration in the aforementioned manner imposes constraints on the way in which the converter can be controlled and so assists in carrying out mathematical optimization to determine the or each optimal limb portion current and/or provide optimal limb portion voltage sources.

In a preferred embodiment of the invention creating an equivalent converter configuration which represents the flow of current through the converter includes mapping possible current flow paths through the converter, and creating an equivalent converter configuration which represents voltage conditions in the converter includes mapping the limb portion voltage source and an inductive component for each limb portion.

Each of mapping the possible current flow paths through the converter and/or mapping the limb portion voltage source and an inductive component for each limb portion helps to tailor the method of control to a given converter topology, i.e. a given converter structure.

Optionally the converter includes a plurality of converter limbs and carrying out mathematical optimization includes a corresponding one of applying a current weighting to the relative current contribution provided by a plurality of limb portions and/or applying a voltage weighting to the relative voltage contribution provided by each limb portion voltage source.

Applying such weightings allows variations in the performance of each limb portion to be further accommodated while continuing to optimise the operation of the converter as a whole.

Another preferred embodiment of the method includes determining the or each weighting according to measured operating parameters of the converter.

Determining the weightings in the aforementioned manner allows the method to take into account environmental factors which might affect the healthy operation of the converter, and to alter the optimal limb portion currents that are determined and/or the optimal limb portion voltage sources that are provided in an effort to overcome the environmental factors and alleviate the associated impact on the operation of the converter. Examples of such environmental factors include the components in one limb portion running hot, or a limb portion suffering component damage or failure such that its performance is degraded.

Preferably when controlling the converter under a particular operating condition applying a weighting includes applying a different weighting to at least one limb portion such that the or each said limb portion provides a different contribution to the other limb portions.

Such a step allows the method to distinguish between one limb portion and another, e.g. according to how well a given limb portion is performing.

This is useful in circumstances where it becomes desirable to reduce the level of current contributed by a given limb portion, e.g. because the cooling associated with the limb portion is operating at a reduced capacity, and temporarily increase the level of current provided by one or more other limb portions so as to allow the converter to continue to operate and provide a high level of power conversion.

It can also be used to reduce the limb portion voltage that a given limb portion must provide, e.g. in circumstances where a fault or other damage has degraded the performance of the given limb portion, such that the converter remains able to continue operating and provide a high level of power conversion.

In a still further preferred embodiment of the invention carrying out mathematical optimization to provide an optimal limb portion voltage source for each limb portion includes reducing any deviation in an actual measured limb portion current of a given limb portion from the corresponding determined limb portion current for the said given limb portion.

Reducing any deviation in an actual measured limb portion current of a given limb portion from the corresponding determined limb portion current for the said given limb portion advantageously introduces feedback into the control of the converter which helps to ensure that the converter continues to operate in an optimised manner.

Optionally the step of reducing any deviation in an actual measured limb portion current from the corresponding determined limb portion current includes calculating an inductive voltage portion for the corresponding limb portion.

Calculating an inductive voltage portion for the corresponding limb portion reduces the number of unknown voltage conditions in the converter and so assists in carrying out mathematical optimization to provide optimal limb portion voltage sources.

The method of the invention may further include modifying the calculated inductive voltage portion to drive the actual measured limb portion current to follow the corresponding determined limb portion current.

Such a step provides a convenient means of causing the actual measured limb portion current to desirably track the corresponding determined limb portion current, and so helps to maintain optimum performance of the converter.

Preferably the method of the invention includes carrying out mathematical optimization to determine one or more minimum individual limb portion currents that the corresponding limb portion must contribute to track the corresponding required AC current demand phase waveform and the required DC current demand, and/or provide minimum individual limb portion voltage sources to achieve the corresponding determined limb portion current.

Determining one or more minimum individual limb portion currents reduces the conduction and switching losses in each limb portion because ordinarily such losses are proportional to current squared, i.e. $I^2$.

In the meantime, determining a minimum individual limb portion voltage source for each limb portion helps to reduce the degree of disruption caused to the converter and so further assists in maintaining its optimised operation.

In a preferred method of controlling a converter including carrying out mathematical optimization only to determine one or more optimal limb portion currents, providing a limb portion voltage source for each limb portion to achieve the corresponding determined limb portion current may include applying a control algorithm to directly establish optimal limb portion voltage sources from each of the corresponding determined limb portion currents.

Such direct establishment of the optimal limb portion voltage sources reduces the computational effort and overhead associated with controlling the converter, and also helps to improve the robustness of the method of the invention with respect to controller uncertainties and modelling errors.

According to a second aspect of the invention there is provided a converter comprising at least one converter limb corresponding to a respective phase of the converter, the or each converter limb extending between first and second DC terminals and including first and second limb portions separated by an AC terminal, the converter further comprising a controller configured to:

(a) obtain a respective AC current demand phase waveform for the or each converter limb which the corresponding converter limb is required to track, and a DC current demand which the or each converter limb is also required to track;

(b) determine a limb portion current for each limb portion that the limb portion must contribute to track the corresponding required AC current demand phase waveform and the required DC current demand;

(c) provide a limb portion voltage source for each limb portion to achieve the corresponding determined limb portion current; and (d) carry out mathematical optimization to determine one or more optimal limb portion currents and/or provide optimal limb portion voltage sources.

The converter of the invention shares the advantages associated with the corresponding features of the method of controlling a converter according to the invention.

There now follows a brief description of preferred embodiments of the invention, by way of non-limiting example, with reference being made to the following figures in which.

Figure 1A:
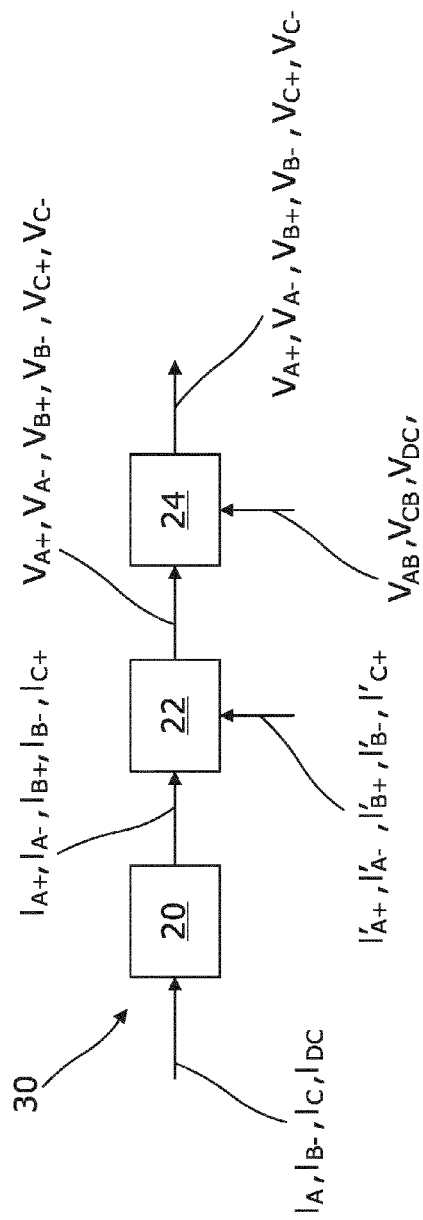
FIG. 1(a) shows a flow diagram which illustrates principle steps in a first method according to the invention of controlling a converter.

Principle steps in a method according to a first embodiment of the invention of controlling a converter are illustrated in a first flow diagram 30 shown in FIG. 1(a).

The first method of the invention is applicable to any converter topology, i.e. a converter having any particular structure. By way of example, however, it is described in connection with a three-phase converter which has three converter limbs, each of which corresponds to one of the three phases. Each converter limb extends between first and second DC terminals and includes first and second limb portions which are separated by an AC terminal.

The first method comprises a first step of obtaining a respective AC current demand phase waveform $I_A$, $I_B$, $I_C$ for each converter limb which each converter limb is required to track, and obtaining a DC current demand $I_{DC}$ which the converter limbs are also required to track.

The various AC current demand phase waveforms $I_A$, $I_B$, $I_C$ and the DC current demand $I_{DC}$ may be obtained directly from a higher-level controller within the particular converter structure or from some other external entity. Alternatively the particular converter structure may obtain it directly by carrying out its own calculations.

The first method also includes a second step (as indicated by a first process box 20 in the first flow diagram 30) of determining a limb portion current for each limb portion that the limb portion must contribute to track the corresponding required AC current demand phase waveform $I_A$, $I_B$, $I_C$ and the required DC current demand $I_{DC}$.

More particularly, the first method of the invention includes carrying out mathematical optimization to determine a number of optimal limb portion currents.

Figure 2:
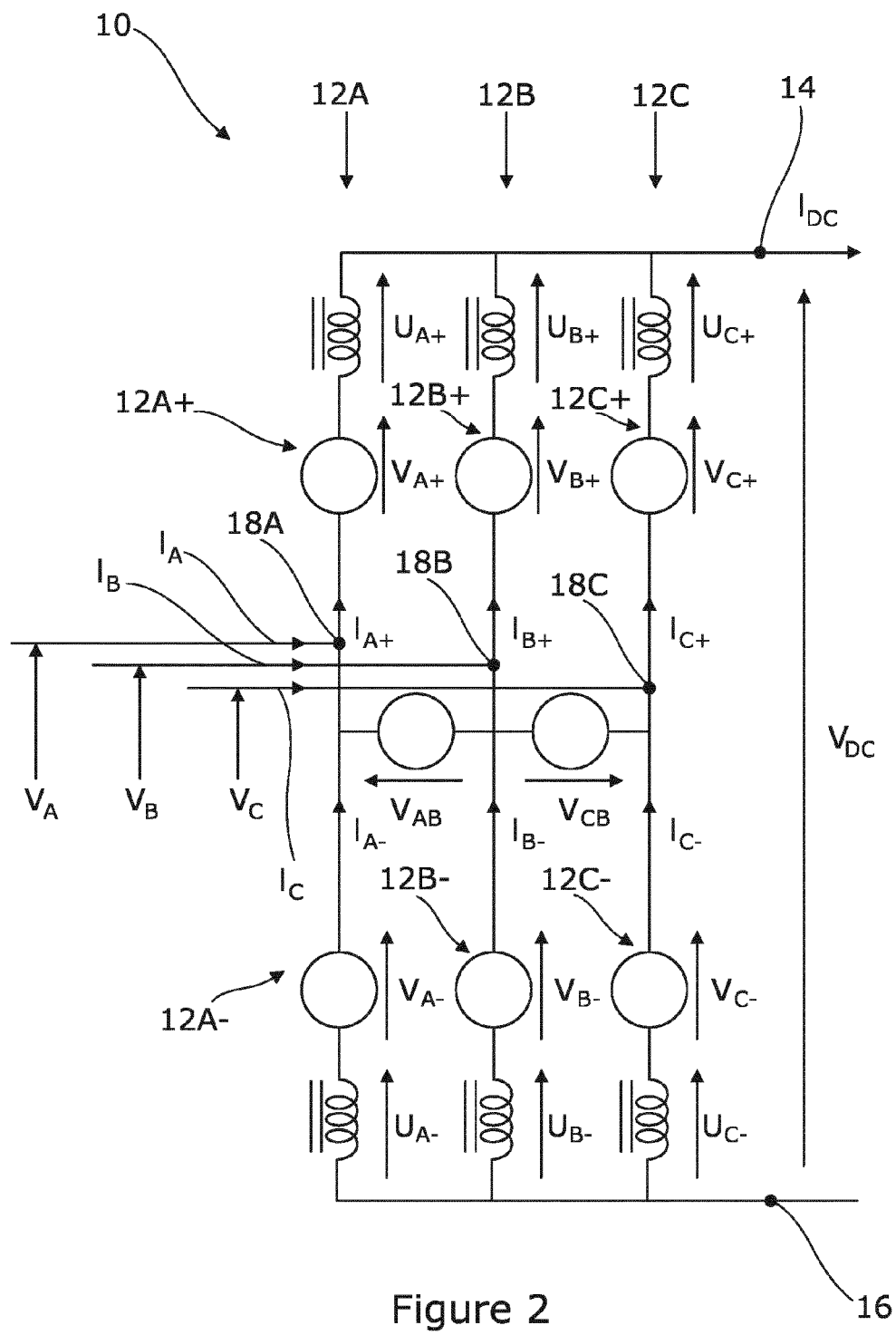
FIG. 2 shows a schematic representation of an equivalent converter configuration.

Carrying out such mathematical optimization includes creating an equivalent converter configuration 10 which represents the flow of current through the corresponding three phase converter structure, as shown in FIG. 2.

The equivalent converter configuration 10 includes three converter limbs 12A, 12B, 12C, each of which corresponds to a respective first, second and third phase of the corresponding three phase converter structure which the method is intended to control. In other embodiments of the invention the converter structure being controlled may have fewer than or more than three phases and hence a different commensurate number of corresponding converter limbs. In these circumstances the equivalent converter configuration likewise has a different corresponding number of converter limbs.

In the equivalent converter configuration 10 shown each converter limb 12A, 12B, 12C extends between first and second DC terminals 14, 16, and each converter limb 12A, 12B, 12C includes a first limb portion 12A+, 12B+, 12C+ and a second limb portion 12A−, 12B−, 12C−. Each pair of first and second limb portions 12A+, 12A−, 12B+, 12B−, 12C+, 12C− in each converter limb 12A, 12B, 12C is separated by a corresponding AC terminal 18A, 18B, 18C.

The equivalent converter configuration 10 also represents the respective AC current demand phase waveforms $I_A$, $I_B$, $I_C$ that each converter limb 12A, 12B, 12C is required to track, e.g. match as closely as possible, and the DC current demand $I_{DC}$ that the converter limbs 12A, 12B, 12C are also required to track.

In practice each converter limb 12A, 12B, 12C must also operate within the constraints of a corresponding AC voltage phase waveform $V_A$, $V_B$, $V_C$ as well as a DC voltage $V_{DC}$ which, typically, correspond to values in respective AC and DC electrical networks to which the particular converter structure is connected, and so the equivalent converter configuration 10 also represents these elements.

By altering the value attributed to each of the various circuit elements mentioned above it is possible to have the equivalent converter configuration 10 reflect any particular converter structure, and thereby have the first method of the invention control the said particular converter structure. It will also be understood that the equivalent converter configuration may have fewer than or more than three phases, and thus likewise it will be understood that the first method of the invention is able also to control particular non three-phase converter structures.

Creating an equivalent converter configuration 10 which represents the flow of current through the corresponding three phase converter structure additionally includes mapping possible current flow paths through the particular converter structure.

One way in which the possible current flow paths through the particular converter structure may be mapped is by conducting a Kirchhoff analysis of the equivalent converter configuration 10 to obtain the following equations:

$$I_A = I_{A+} - I_{A-}$$

$$I_B = I_{B+} - I_{B-}$$

$$I_C = I_{C+} - I_{C-}$$

$$I_{DC} = I_{A+} + I_{B+} + I_{C+}$$

and then expressing these equations in a matrix form, i.e.:

$$\overbrace{\begin{pmatrix} 1 & -1 & 0 & 0 & 0 & 0 \\ 0 & 0 & 1 & -1 & 0 & 0 \\ 0 & 0 & 0 & 0 & 1 & -1 \\ 1 & 0 & 1 & 0 & 1 & 0 \end{pmatrix}}^{A} \cdot \overbrace{\begin{pmatrix} I_{A+} \\ I_{A-} \\ I_{B+} \\ I_{B-} \\ I_{C+} \\ I_{C-} \end{pmatrix}}^{x} = \overbrace{\begin{pmatrix} I_A \\ I_B \\ I_C \\ I_{DC} \end{pmatrix}}^{b}$$

such that A is a matrix which maps the possible current flow paths provided by the limb portions 12A+, 12A−, 12B+, 12B−, 12C+, 12C−.

Depending on the particular converter structure of whichever converter the method of the invention is controlling, the A matrix may take a different form. It may also additionally include details of the state, e.g. "on"=1, or "off"=0, of any switches within the converter which might impact on the available current flow paths at any particular moment depending on their switching state.

In addition, other equivalent converter configurations and corresponding analysis techniques are also possible.

Depending on the particular structure of the converter the first method of the invention is controlling, one or more of the limb portion currents to be mathematically optimized may be dependent on the remaining limb portion currents. In other words, while each of the remaining limb portion currents may be determined independently of one another, the or each dependent limb portion current will be established automatically according to each of the remaining independent limb portion currents.

In the example three phase converter in relation to which the first method is described, five of the six limb portion currents may be determined independently and hence can be mathematically optimized, while the sixth limb portion current will follow automatically from the other five mathematically optimized limb portion currents. As a result, in the example first method described mathematical optimization is carried out to determine five optimal limb portion currents.

For example, in the equivalent converter configuration 10 shown in FIG. 2, further Kirchhoff analysis can be used to obtain the following equation:

$$I_{C-} = (I_{A+} + I_{B+} + I_{C+}) - (I_{A-} + I_{B-})$$

Accordingly, $I_{C-}$ is defined as the dependent limb portion current since it becomes known, i.e. can be calculated automatically, once each of the remaining independent optimal limb portion currents $I_{A+}$, $I_{A-}$, $I_{B+}$, $I_{B-}$, $I_{C+}$ has been determined using the aforesaid mathematical optimization.

It will be appreciated that depending on the Kirchhoff analysis carried out one or other of the limb portion currents $I_{A+}$, $I_{A-}$, $I_{B+}$, $I_{B-}$, $I_{C+}$ may instead be defined as a dependent limb portion current. Moreover, still further equivalent converter configurations (not shown) may represent a particular converter structure which results in two or more of the limb portion currents being dependent on the other remaining limb portion currents.

As a result of the foregoing analysis, in the example embodiment described five independent optimal limb portion currents $I_{A+}$, $I_{A-}$, $I_{B+}$, $I_{B-}$, $I_{C+}$ are determined by carrying out mathematical optimization while a sixth dependent limb portion current $I_{C-}$ follows automatically, e.g. by equivalent circuit analysis and related calculation, once each of the independent optimal limb portion currents $I_{A+}$, $I_{A-}$, $I_{B+}$, $I_{B-}$, $I_{C+}$ has been determined by carrying out the said mathematical optimization.

In any event, the aforementioned mathematical optimization step also includes applying a current weighting to the relative current contribution provided by each limb portion 12A+, 12A−, 12B+, 12B−, 12C+, 12C−. The respective current weighting for each limb portion 12A+, 12A−, 12B+, 12B−, 12C+, 12C− is determined according to measured operating parameters of the particular converter structure being controlled. The various current weightings can be determined throughout operation of the said converter so as to permit an updating of the current weightings, e.g. in response to changing environmental conditions. As a result the various current weightings can vary as the converter is controlled.

For example, during normal operation of the said particular converter structure an identical current weighting is applied to each limb portion current $I_{A+}$, $I_{A-}$, $I_{B+}$, $I_{B-}$, $I_{C+}$, $I_{C-}$. However, when controlling the particular converter structure under certain operating conditions, e.g. an abnormal operating condition, a different current weighting is applied to the current contribution, i.e. the limb portion current $I_{A+}$, $I_{A-}$, $I_{B+}$, $I_{B-}$, $I_{C+}$, $I_{C-}$, provided by at least one limb portion 12A+, 12A−, 12B+, 12B−, 12C+, 12C−.

Figure 3A:
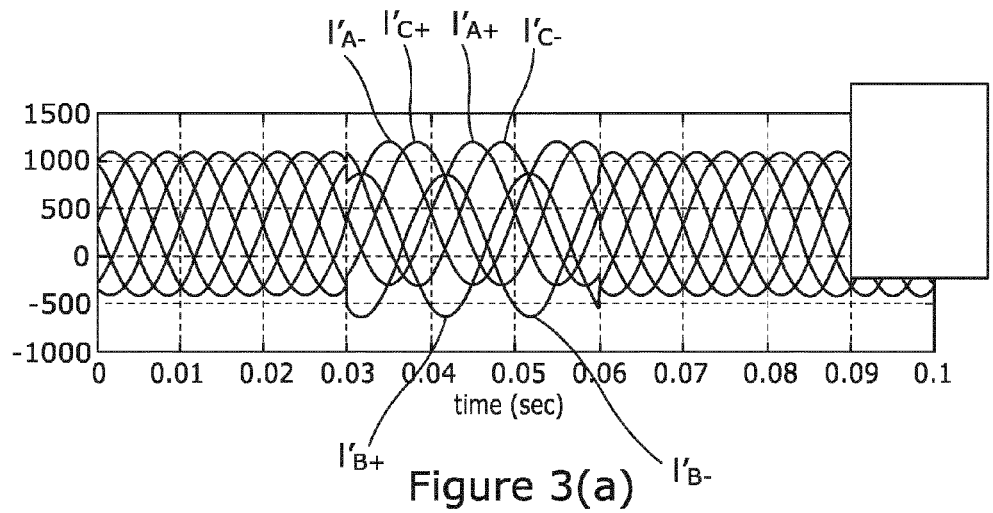
FIG. 3(a) illustrates the result of applying a different current weighting to the current contribution provided by two limb portions within a converter during control of the converter.

FIG. 3(a) illustrates a given operating period of the particular converter structure within which, i.e. between 0.03 and 0.06 seconds, a larger current weighting is applied to the optimal limb portion current $I_{B+}$, $I_{B-}$ that each limb portion 12B+, 12B− of the second converter limb 12B must contribute. Such current weightings reduce an actual limb portion current, i.e. a measured limb portion current I'$_{B+}$, I'$_{B-}$, that each said limb portion 12B+, 12B− contributes relative to an actual current contribution, i.e. a measured limb portion current contribution I'$_{A+}$, I'$_{A-}$, I'$_{C+}$, I'$_{C-}$, of each of the other limb portions 12A+, 12A−, 12C+, 12C, which are all the same as one another.

In addition to the foregoing the first method includes carrying out mathematical optimization to determine a minimum individual limb portion current $I_{A+}$, $I_{A-}$, $I_{B+}$, $I_{B-}$, $I_{C+}$ that each of the independent limb portions 12A+, 12A−, 12B+, 12B−, 12C+ must contribute so as to track the corresponding required AC current demand phase waveform $I_A$, $I_B$, $I_C$ and the required DC current demand $I_{DC}$.

One way in which minimum individual limb portion currents $I_{A+}$, $I_{A-}$, $I_{B+}$, $I_{B-}$, $I_{C+}$, i.e. x in the A·x=b equation set out above, may be determined (noting that the sixth dependent limb portion current $I_{C-}$ will follow automatically once mathematical optimization has been carried out to determine the independent minimum limb portion currents $I_{A+}$, $I_{A-}$, $I_{B+}$, $I_{B-}$, $I_{C+}$), and the aforementioned individual current weightings applied to the minimal individual limb portion currents $I_{A+}$, $I_{A-}$, $I_{B+}$, $I_{B-}$, $I_{C+}$, is by solving a nonlinear optimization of the general form:

$$\min_x J_{Current} = \Psi(x(t_1)) + \int_{t_0}^{t_1} f(x(t), t)\, dt$$

subject to the equality constrained equation of the form:

$$A \cdot x = b$$

where
$J_{Current}$ is the current objective function to be minimized;
$\Psi$ is the current weighting at time $t_1$;
f is the current cost function which in the embodiment described includes a current weighting matrix $Q_I$;
x is the transpose of $[I_{A+}, I_{A-}, I_{B+}, I_{B-}, I_{C+}, I_{C-}]$, i.e. $[I_{A+}, I_{A-}, I_{B+}, I_{B-}, I_{C+}, I_{C-}]$ reflected in a column vector;
$t_0$ is the time at which a particular period of control of the particular converter structure starts; and
$t_1$ is the time at which a particular period of control of the particular converter structure ends.

The current weighting matrix $Q_I$ is determined according to measured operating parameters of the converter, and may be so determined throughout the operation of the particular converter structure, such that it can vary as the said converter is controlled in response to changes in the operation of the converter.

When subject only to an equality constrained equation, as mentioned above, the Lagrangian (or the method of Lagrange multipliers) is a technique for solving the above-identified nonlinear optimization in order to find local minima of the current objective function $J_{Current}$. It may also be solved using other optimization algorithms, including iterative and programming algorithms.

As a general optimal control problem, the aforementioned nonlinear optimization could additionally include one or more inequality constraints in which case it could be solved by using the further method of Hamiltonian (Pontryagin's minimum principle).

One example of such an inequality constraint is:

$$C \begin{pmatrix} I_{A+} \\ I_{A-} \\ I_{B+} \\ I_{B-} \\ I_{C+} \\ I_{C-} \end{pmatrix} \leq \begin{pmatrix} I_{A+}^{max} \\ I_{A-}^{max} \\ I_{B+}^{max} \\ I_{B-}^{max} \\ I_{C+}^{max} \\ I_{C-}^{max} \end{pmatrix}$$

where
C is a matrix which maps possible maximum current flow paths provided by the limb portions 12A+, 12A−, 12B+, 12B−, 12C+, 12C−; and
d is a vector representing of the maximum desired current in each limb portion 12A+, 12A−, 12B+, 12B−, 12C+, 12C−.

In either case the minimum individual limb portion currents $I_{A+}$, $I_{A-}$, $I_{B+}$, $I_{B-}$, $I_{C+}$, $I_{C-}$ may also be determined by solving a nonlinear optimization of the form $$\max_x \{-J_{Current}\}.$$

Meanwhile, the first method of the invention includes a third step of providing a limb portion voltage source for each limb portion 12A+, 12A−, 12B+, 12B−, 12C+, 12C− to achieve the corresponding mathematically optimized minimum limb portion current $I_{A+}$, $I_{A-}$, $I_{B+}$, $I_{B-}$, $I_{C+}$ and the associated dependent limb portion current $I_{C-}$.

More particularly, the first method of the invention includes carrying out mathematical optimization to provide optimal limb portion voltage sources. In other embodiments of the method of the invention, however, such mathematical optimization of the limb portion voltage sources need not take place. Furthermore, in still further embodiments of the method of the invention, the following step of carrying out mathematical optimization to provide optimal limb portion voltage sources may take place without first carrying out mathematical optimisation to determine one or more optimal limb portion currents, i.e. it may take place based only on conventionally determined limb portion currents.

In any event carrying out mathematical optimization to provide optimal limb portion voltage sources includes creating an equivalent converter configuration which represents voltage conditions in the converter, i.e. includes creating the equivalent three-phase converter configuration 10 shown in FIG. 2.

Representing the voltage conditions in the particular three-phase converter structure portrayed in the equivalent converter configuration 10 additionally includes mapping a limb portion voltage source $V_{A+}$, $V_{A-}$, $V_{B+}$, $V_{B-}$, $V_{C+}$, $V_{C-}$ and an inductive component for each limb portion 12A+, 12A−, 12B+, 12B−, 12C+, 12C−.

Each limb portion voltage source $V_{A+}$, $V_{A-}$, $V_{B+}$, $V_{B-}$, $V_{C+}$, $V_{C-}$ may be fixed in magnitude and switchable into and out of the corresponding limb portion 12A+, 12A−, 12B+, 12B−, 12C+, 12C− or, as is the case in the particular converter structure depicted in the equivalent converter configuration 10 shown in FIG. 2, may be variable in magnitude between zero (i.e. equivalent to being switched out of the corresponding limb portion 12A+, 12A−, 12B+, 12B−, 12C+, 12C−) and an upper voltage limit.

Meanwhile the inductive component for each limb portion 12A+, 12A−, 12B+, 12B−, 12C+, 12C− represents the inductance associated with the corresponding limb portion 12A+, 12A−, 12B+, 12B−, 12C+, 12C−. Such inductance may take the form of an inductor within a given limb portion 12A+, 12A−, 12B+, 12B−, 12C+, 12C−, i.e. a limb portion inductance, or the form of a stray inductance electrically associated with a given limb portion 12A+, 12A−, 12B+, 12B−, 12C+, 12C−, e.g. a phase inductance and/or a DC line inductance.

In connection with the first method of the invention, the inductive component of each limb portion 12A+, 12A−, 12B+, 12B−, 12C+, 12C− is represented in the equivalent converter configuration 10 as a inductive voltage portion $U_{A+}$, $U_{A-}$, $U_{B+}$, $U_{B-}$, $U_{C+}$, $U_{C-}$ that is made up of the voltage arising from the flow of current through the aforementioned inductance associated with a corresponding limb portion 12A+, 12A−, 12B+, 12B−, 12C+, 12C−.

In this way it is again possible to have the equivalent converter configuration 10 reflect a particular converter structure by altering the value attributed to each of the various limb portion voltage source and inductive voltage portion elements.

In other embodiments of the invention representing of the voltage conditions in the particular three-phase converter structure may additionally include mapping a resistive component for each limb portion 12A+, 12A−, 12B+, 12B−, 12C+, 12C−.

Such a resistive component represents the resistance associated with a given limb portion 12A+, 12A−, 12B+, 12B−, 12C+, 12C−, and similarly may take the form of a resistor within a given limb portion 12A+, 12A−, 12B+, 12B−, 12C+, 12C−, i.e. a limb portion resistance, or the form of a resistance electrically associated with a given limb portion 12A+, 12A−, 12B+, 12B−, 12C+, 12C−, e.g. a phase resistance and/or a DC line resistance.

Mapping the limb portion voltage sources $V_{A+}$, $V_{A-}$, $V_{B+}$, $V_{B-}$, $V_{C+}$, $V_{C-}$ and inductive voltage portions $U_{A+}$, $U_{A-}$, $U_{B+}$, $U_{B-}$, $U_{C+}$, $U_{C-}$ again similarly includes conducting a Kirchhoff analysis of the equivalent converter configuration 10, although other equivalent converter configurations and corresponding analysis techniques are also possible. In applying the Kirchhoff analysis the following equation, in matrix form, is obtained:

$$M_V \cdot \begin{pmatrix} V_{A+} \\ V_{A-} \\ V_{B+} \\ V_{B-} \\ V_{C+} \\ V_{C-} \end{pmatrix} - M_U \cdot \begin{pmatrix} U_{A+} \\ U_{A-} \\ U_{B+} \\ U_{B-} \\ U_{C+} \\ U_{C-} \\ V_{DC} \\ V_{AB} \\ V_{CB} \end{pmatrix} = \begin{pmatrix} 0 \\ 0 \\ 0 \\ 0 \\ 0 \end{pmatrix}$$

where:

$$M_V = \begin{pmatrix} 1 & 1 & -1 & -1 & 0 & 0 \\ 0 & 0 & 1 & 1 & -1 & -1 \\ 0 & 0 & 0 & 0 & 1 & 1 \\ 1 & 0 & -1 & 0 & 0 & 0 \\ 0 & 0 & 1 & 0 & -1 & 0 \end{pmatrix}$$

i.e. $M_V$ is a matrix which maps the position of the limb portion voltage sources $V_{A+}$, $V_{A-}$, $V_{B+}$, $V_{B-}$, $V_{C+}$, $V_{C-}$ within the particular converter structure;

$$M_U = \begin{pmatrix} 1 & -1 & -1 & 1 & 0 & 0 & 0 & 0 & 0 \\ 0 & 0 & 1 & -1 & -1 & 1 & 0 & 0 & 0 \\ 0 & 0 & 0 & 0 & 1 & -1 & -1 & 0 & 0 \\ 1 & 0 & -1 & 0 & 0 & 0 & 0 & 1 & 0 \\ 0 & 0 & 1 & 0 & -1 & 0 & 0 & 0 & -1 \end{pmatrix}$$

i.e. $M_U$ is a matrix which maps the position of the inductive voltage portions $U_{A+}$, $U_{A-}$, $U_{B+}$, $U_{B-}$, $U_{C+}$, $U_{C-}$ within the particular converter structure;

$V_{DC}$ is the DC voltage, i.e. the voltage difference between the first and second DC terminals 14, 16;

$V_{AB}$ is the voltage difference between the first and second converter limbs 12A, 12B; and $V_{CB}$ is the voltage difference between the third and second converter limbs 12C, 12B.

Depending on the particular converter structure of whichever converter the method of the invention is controlling, one or more of the $M_V$ and/or $M_U$ matrices may take a different form.

In the first method of the invention, carrying out mathematical optimization to provide an optimal limb portion voltage source $V_{A+}$, $V_{A-}$, $V_{B+}$, $V_{B-}$, $V_{C+}$, $V_{C-}$ for each limb portion 12A+, 12A−, 12B+, 12B−, 12C+, 12C− includes reducing any deviation in an actual measured limb portion current $I'_{A+}$, $I'_{A-}$, $I'_{B+}$, $I'_{B-}$, $I'_{C+}$ of a given independent limb portion 12A+, 12A−, 12B+, 12B−, 12C+ from the corresponding determined optimal limb portion current $I_{A+}$, $I_{A-}$, $I_{B+}$, $I_{B-}$, $I_{C+}$ for the said given limb portion 12A+, 12A−, 12B+, 12B−, 12C+.

The first method of controlling the particular three-phase converter structure further includes calculating the inductive voltage portion $U_{A+}$, $U_{A-}$, $U_{B+}$, $U_{B-}$, $U_{C+}$, $U_{C-}$ for each limb portion 12A+, 12A−, 12B+, 12B−, 12C+, 12C−. This calculation is based on the corresponding determined optimal limb portion currents $I_{A+}$, $I_{A-}$, $I_{B+}$, $I_{B-}$, $I_{C+}$ and dependent limb portion current $I_{C-}$, together with the inductance associated with the corresponding limb portion 12A+, 12A−, 12B+, 12B−, 12C+, 12C−.

Thereafter the calculated inductive voltage portion $U_{A+}$, $U_{A-}$, $U_{B+}$, $U_{B-}$, $U_{C+}$, $U_{C-}$ is modified to drive the actual measured limb portion current $I'_{A+}$, $I'_{A-}$, $I'_{B+}$, $I'_{B-}$, $I'_{C+}$ to follow the corresponding determined optimal limb portion current $I_{A+}$, $I_{A-}$, $I_{B+}$, $I_{B-}$, $I_{C+}$.

Such measuring and modification takes the form of a feedback loop which provides closed-loop control, as illustrated schematically by a second box 22 in the first flow diagram 30. The feedback loop may additionally include a feed-forward element which seeks to predict desirable future values for one or more of the inductive voltage portions $U_{A+}$, $U_{A-}$, $U_{B+}$, $U_{B-}$, $U_{C+}$, $U_{C-}$ in order to improve the performance of the closed-loop control.

The calculated inductive voltage portion $U_{A+}$, $U_{A-}$, $U_{B+}$, $U_{B-}$, $U_{C+}$, $U_{C-}$ of each limb portion 12A+, 12A−, 12B+, 12B−, 12C+, 12C− is utilised, as indicated by a third process box 24 in the first flow diagram 30, when carrying out the aforementioned mathematical optimization to provide the optimal limb portion voltage sources $V_{A+}$, $V_{A-}$, $V_{B+}$, $V_{B-}$, $V_{C+}$, $V_{C-}$.

Such mathematical optimization also includes applying a voltage weighting to the relative voltage contribution provided by each limb portion voltage source $V_{A+}$, $V_{A-}$, $V_{B+}$, $V_{B-}$, $V_{C+}$, $V_{C-}$. The voltage weightings are determined according to measured operating parameters of the particular converter structure being controlled, and may be so determined throughout operation of the said converter. Such potentially repeated determination of the voltage weightings permits the ongoing optimization of the converter operation during, e.g. changing environmental conditions.

For example, during normal operation of the said particular converter structure an identical voltage weighting is applied to the limb portion voltage source $V_{A+}$, $V_{A-}$, $V_{B+}$, $V_{B-}$, $V_{C+}$, $V_{C-}$ of each limb portion 12A+, 12A−, 12B+, 12B−, 12C+, 12C−.

However during, e.g. abnormal operating conditions, a different voltage weighting can be applied to the limb portion voltage source $V_{A+}$, $V_{A-}$, $V_{B+}$, $V_{B-}$, $V_{C+}$, $V_{C-}$ of one or more limb portions 12A+, 12A−, 12B+, 12B−, 12C+, 12C− to further alleviate the impact of, e.g. the abnormal operating conditions.

More particularly, in the first method of the invention, carrying out mathematical optimisation to provide an optimal limb portion voltage source $V_{A+}$, $V_{A-}$, $V_{B+}$, $V_{B-}$, $V_{C+}$, $V_{C-}$ for each limb portion 12A+, 12A−, 12B+, 12B−, 12C+, 12C− includes determining a minimum individual limb portion voltage source $V_{A+}$, $V_{A-}$, $V_{B+}$, $V_{B-}$, $V_{C+}$, $V_{C-}$ for each limb portion 12A+, 12A−, 12B+, 12B−, 12C+, 12C− that is required to achieve the corresponding minimum limb portion current $I_{A+}$, $I_{A-}$, $I_{B+}$, $I_{B-}$, $I_{C+}$, $I_{C-}$ previously determined.

One way in which minimum individual limb portion voltage sources $V_{A+}$, $V_{A-}$, $V_{B+}$, $V_{B-}$, $V_{C+}$, $V_{C-}$ (i.e. the minimum level of voltage a variable voltage source within a given limb portion 12A+, 12A−, 12B+, 12B−, 12C+, 12C− must provide) may be determined, and the aforementioned individual voltage weightings applied thereto, is by solving for x (where x is the transpose of [$V_{A+}$, $V_{A-}$, $V_{B+}$, $V_{B-}$, $V_{C+}$, $V_{C-}$]) a nonlinear optimization of the general form:

$$\min_x J_{Voltage} = \Psi(x(t_1)) + \int_{t_0}^{t_1} f(x(t), t)\, dt$$

subject to an equality constrained equation $M_V \cdot x = b$, where b is known, of the form:

$$M_V \cdot \begin{pmatrix} V_{A+} \\ V_{A-} \\ V_{B+} \\ V_{B-} \\ V_{C+} \\ V_{C-} \end{pmatrix} = M_U \cdot \begin{pmatrix} U_{A+} \\ U_{A-} \\ U_{B+} \\ U_{B-} \\ U_{C+} \\ U_{C-} \\ V_{DC} \\ V_{AB} \\ V_{CB} \end{pmatrix}$$

and where $J_{Voltage}$ is the voltage objective function to be minimized;

$\Psi$ is the voltage weighting at time $t_1$ f is the voltage cost function which in the first method of the invention includes a voltage weighting matrix $Q_V$;

$t_0$ is the time at which a particular period of control of the particular converter structure starts; and $t_1$ is the time at which a particular period of control of the particular converter structure ends.

The voltage weighting matrix $Q_V$ is similarly determined according to measured operating parameters of the converter, and may be so determined throughout the operation of the particular converter structure. As such it too can vary as the said converter is controlled.

Solving the nonlinear optimization mentioned above may also be made subject to an inequality equation of the form:

$$C \cdot x < d$$

where

C is a matrix which maps the position of possible maximum limb portion voltage sources in the limb portions 12A+, 12A−, 12B+, 12B−, 12C+, 12C−; and d is a vector representing of the maximum desired voltage in each limb portion 12A+, 12A−, 12B+, 12B−, 12C+, 12C−

Figure 3B:
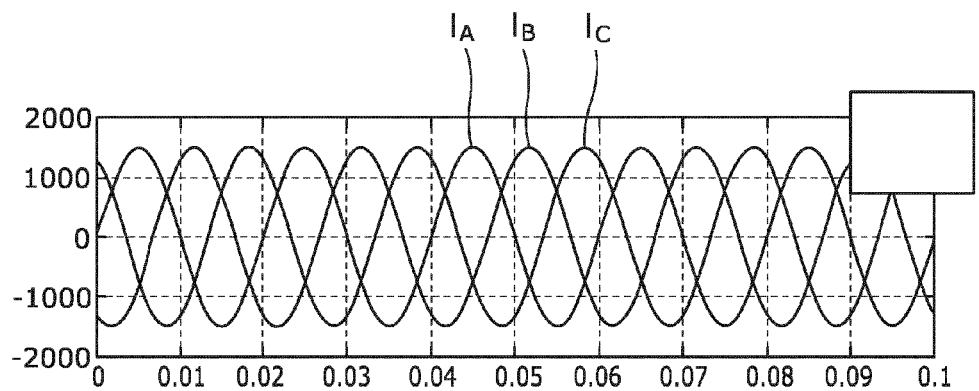
FIG. 3(b) illustrates how the converter is controlled to maintain desired AC current demand phase waveforms while the limb portion currents differ from one another in the manner shown in FIG. 3(a)
Figure 3C:
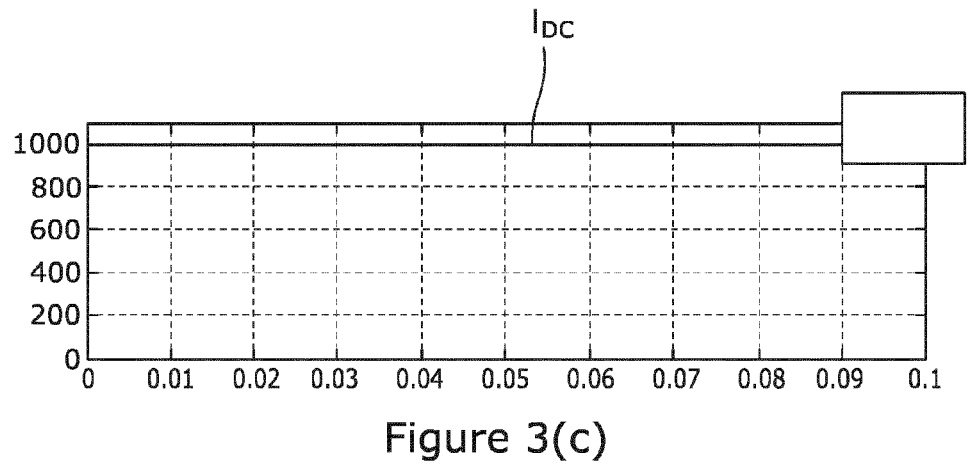
FIG. 3(c) illustrates how the converter is controlled to maintain a desired DC current demand value while the limb portion currents differ from one another in the manner shown in FIG. 3(a)

As shown in FIGS. 3(b) and 3(c), the aforementioned first method of controlling a particular converter structure allows, for example, continued tracking of the desired AC current demand phase waveforms $I_A$, $I_B$, $I_C$ and the desired DC current demand level $I_{DC}$ by the converter limbs 12A, 12B, 12C, as required, throughout the period in which the actual measured limb portion currents $I'_{B+}$, $I'_{B-}$ contributed by the second converter limb 12B differ from the actual measured limb portion currents $I'_{A+}$, $I'_{A-}$, $I'_{C+}$, $I'_{C-}$ contributed by the first and second converter limbs 12A, 12C.

Figure 1B:
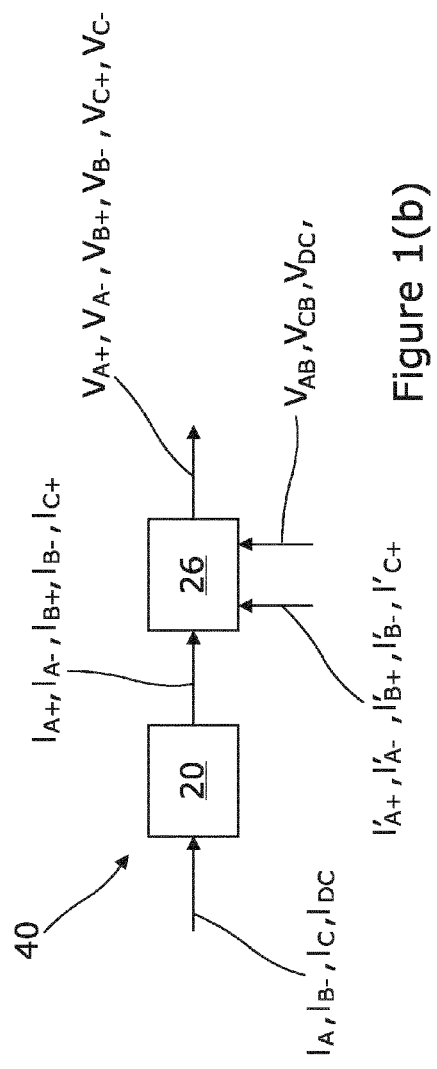
FIG. 1(b) shows a flow diagram which illustrates principle steps in a second method according to the invention of controlling a converter.

Principle steps in a method according to a second embodiment of the invention of controlling a converter are illustrated in a second flow diagram 40 shown in FIG. 1(b).

The second method of the invention is similar to the first method of the invention and likewise is applicable to any converter topology, i.e. a converter having any particular structure. By way of example, the second method of the invention is again described in terms of its control of the particular three-phase converter structure depicted in the equivalent converter configuration 10 shown in FIG. 2.

The second method comprises a first step which is identical to that of the first method, i.e. obtaining a respective AC current demand phase waveform $I_A$, $I_B$, $I_C$ for each converter limb 12A, 12B, 12C which the corresponding converter limb 12A, 12B, 12C is required to track, and obtaining a DC current demand $I_{DC}$ which the converter limbs 12A, 12B, 12C are also required to track.

The second method also includes an identical second step to the first method, as similarly indicated by a first process box 20 in the second flow diagram 40. As such the second step of the second method of the invention again includes carrying out mathematical optimization to determine five independent minimum limb portion currents $I_{A+}$, $I_{A-}$, $I_{B+}$, $I_{B-}$, $I_{C+}$ that each corresponding limb portion 12A+, 12A−, 12B+, 12B−, 12C+ must contribute to track the corresponding required AC current demand phase waveform $I_A$, $I_B$, $I_C$ and the required DC current demand $I_{DC}$.

In the second method such mathematical optimization is carried out in exactly the same manner as in relation to the first method, i.e. as described hereinabove.

The second method of the invention also includes a third step of providing a limb portion voltage source $V_{A+}$, $V_{A-}$, $V_{B+}$, $V_{B-}$, $V_{C+}$, $V_{C-}$ for each limb portion 12A+, 12A−, 12B+, 12B−, 12C+, 12C− to achieve the corresponding minimum limb portion current $I_{A+}$, $I_{A-}$, $I_{B+}$, $I_{B-}$, $I_{C+}$ previously determined.

More particularly the second method of the invention includes a third step of applying a control algorithm to directly establish optimal limb portion voltage sources $V_{A+}$, $V_{A-}$, $V_{B+}$, $V_{B-}$, $V_{C+}$, $V_{C-}$ from each of the corresponding determined minimum limb portion current $I_{A+}$, $I_{A-}$, $I_{B+}$, $I_{B-}$, $I_{C+}$, as shown by a single fourth box 26 in the second flow diagram 40.

Applying such a control algorithm includes reducing any deviation in the actual measured limb portion current $I'_{A+}$, $I'_{A-}$, $I'_{B+}$, $I'_{C+}$ of a given independent limb portion 12A+, 12A−, 12B+, 12B−, 12C+ from the corresponding determined minimum limb portion current $I_{A+}$, $I_{A-}$, $I_{B+}$, $I_{B-}$, $I_{C+}$ for the said given limb portion 12A+, 12A−, 12B+, 12B−, 12C+.

Figure 4:
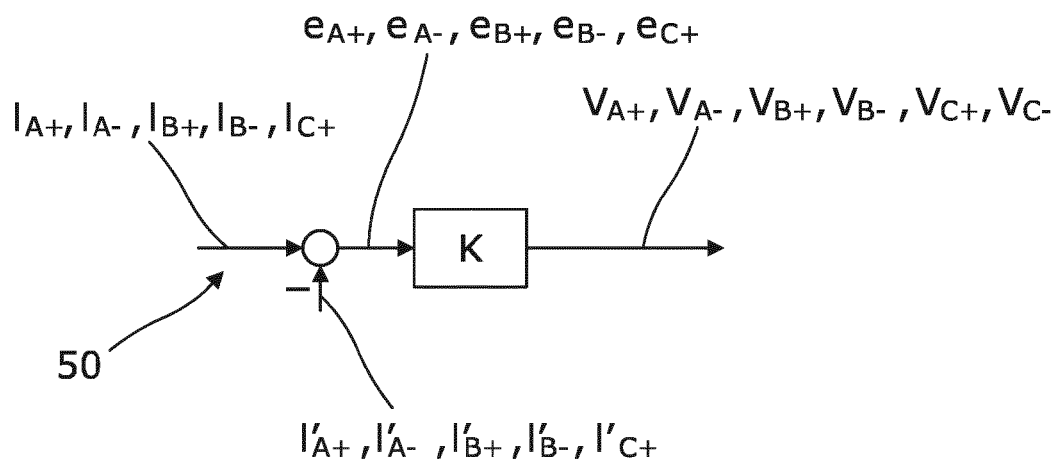
FIG. 4 shows a schematic view of a feedback loop which forms part of the method illustrated in FIG. 1(b).

One way in which the deviation in the actual measured limb portion current $I'_{A+}$, $I'_{A-}$, $I'_{B+}$, $I'_{B-}$ of a given independent limb portion 12A+, 12A−, 12B+, 12B−, 12C+ from the corresponding determined minimum limb portion current $I_{A+}$, $I_{A-}$, $I_{B+}$, $I_{B-}$, $I_{C+}$ may be reduced, and preferably eliminated, is by establishing a feedback loop 50 as shown schematically in FIG. 4.

In the embodiment shown the feedback loop 50 compares a respective actual measured limb portion current $I'_{A+}$, $I'_{A-}$, $I'_{B+}$, $I'_{B-}$, $I'_{C+}$ with the corresponding determined minimum limb portion current $I_{A+}$, $I_{A-}$, $I_{B+}$, $I_{B-}$, $I_{C+}$ and calculates a corresponding limb portion error $e_{A+}$, $e_{A-}$, $e_{B+}$, $e_{B-}$, $e_{C+}$. The feedback loop 50 then applies a correction factor K to each limb portion error $e_{A+}$, $e_{A-}$, $e_{B+}$, $e_{B-}$, $e_{C+}$ to thereby establish directly the corresponding limb portion voltage source $V_{A+}$, $V_{A-}$, $V_{B+}$, $V_{B-}$, $V_{C+}$, $V_{C-}$ which is required to drive the error $e_{A+}$, $e_{A-}$, $e_{B+}$, $e_{B-}$, $e_{C+}$ towards zero.

The correction factor K may take the form of a control system matrix, such as a gain matrix (not shown), which sets out individual correction factors that each limb portion error $e_{A+}$, $e_{A-}$, $e_{B+}$, $e_{B-}$, $e_{C+}$ is, e.g. multiplied by in the case of a gain matrix, to establish the corresponding limb portion voltage source $V_{A+}$, $V_{A-}$, $V_{B+}$, $V_{B-}$, $V_{C+}$, $V_{C-}$.

One way in which such individual correction factors may be established is by creating an equivalent converter configuration that represents the voltage conditions in the particular three-phase converter structure under control and thereafter considering the dynamics of such an equivalent converter configuration.

More particularly, in relation to the embodiment described hereinabove, the foregoing steps may be achieved by creating the equivalent converter configuration 10 shown in FIG. 2 and mapping a limb portion voltage source $V_{A+}$, $V_{A-}$, $V_{B+}$, $V_{B-}$, $V_{C+}$, $V_{C-}$ and an inductive component for each limb portion 12A+, 12A−, 12B+, 12B−, 12C+, 12C−.

Thereafter such mapping may include conducting a Kirchhoff analysis of the equivalent converter configuration 10 (although other equivalent converter configurations and corresponding analysis techniques are also possible) that applies Kirchhoff's current and voltage laws to describe the dynamics of the equivalent converter configuration 10 as:

$$v = M\frac{dI}{dt} + N\xi$$

where:
  $v$ is the transpose of $[V_{A+}, V_{A-}, V_{B+}, V_{B-}, V_{C+}, V_{C-}]$;
  M is a coupled-inductance matrix which maps the inductive component of each limb portion, and more particularly maps each of the individual limb portion, phase and DC line inductances associated with each limb portion; e.g.

$$M = 10^{-3}\begin{pmatrix} 6 & -2 & 1 & 0 & 1 \\ -1 & 5 & 1 & 0 & 1 \\ 1 & 0 & 6 & -2 & 1 \\ 1 & 0 & -1 & 5 & 1 \\ -1 & 2 & -1 & 2 & 4 \\ 6 & -5 & 6 & -5 & 4 \end{pmatrix};$$

I is the transpose of $[I'_{A+}, I'_{A-}, I'_{B+}, I'_{B-}, I'_{C+}]$, i.e. the transpose of a currents vector representing the actual measured independent limb portion currents $I'_{A+}$, $I'_{A-}$, $I'_{B+}$, $I'_{B-}$, $I'_{C+}$;
  N is an input voltage matrix which maps the position of various input voltages within the particular converter structure, e.g.

$$N = \frac{1}{6}\begin{bmatrix} 3 & -4 & 2 \\ 3 & 4 & -2 \\ 3 & 2 & 2 \\ 3 & -2 & -2 \\ 3 & 2 & -4 \\ 3 & -2 & 4 \end{bmatrix};$$

and
  $\xi$ is an input voltages vector representing external disturbances, e.g.

$$\xi = \begin{bmatrix} V_{DC} \\ V_{AB} \\ V_{CB} \end{bmatrix}$$

where $V_{DC}$ is the DC voltage, i.e. the voltage difference between the first and second DC terminals 14, 16;

$V_{AB}$ is the voltage difference between the first and second converter limbs 12A, 12B; and $V_{CB}$ is the voltage difference between the third and second converter limbs 12C, 12B.

Depending on the particular converter structure of whichever converter the method of the invention is controlling, and depending on which limb portion is/are chosen as being dependent on the other limb portions, one or more of the M and N matrices may similarly take different forms.

In this way, conducting the aforesaid Kirchhoff analysis makes it possible to take into account all of the factors mentioned above relating to a particular converter structure, i.e. M, I, N, $\xi$, when considering what impact a change in one or more individual limb portion voltage sources $V_{A+}$, $V_{A-}$, $V_{B+}$, $V_{B-}$, $V_{C+}$, $V_{C-}$ will have, e.g. on the actual measured limb portion current $I'_{A+}$, $I'_{A-}$, $I'_{B+}$, $I'_{B-}$, $I'_{C-}$ produced by the particular converter structure. This ability renders the second method of the invention robust against controller uncertainties and modelling errors.

Moreover, as a result it is possible thereafter to establish each of the individual correction factors by considering what change needs to be made to a given individual limb portion voltage source $V_{A+}$, $V_{A-}$, $V_{B+}$, $V_{B-}$, $V_{C+}$, $V_{C-}$ to desirably alter the corresponding limb portion current provided by the particular converter structure under control, i.e. the corresponding actual measured limb portion current $I'_{A+}$, $I'_{A-}$, $I'_{B+}$, $I'_{B-}$, $I'_{C+}$, in order to drive the actual measured limb portion current $I'_{A+}$, $I'_{A-}$, $I'_{B+}$, $I'_{B-}$, $I'_{C+}$ towards the determined minimum limb portion current $I_{A+}$, $I_{A-}$, $I_{B+}$, $I_{B-}$, $I_{C+}$, i.e. in order to reduce the corresponding limb portion error $e_{A+}$, $e_{A-}$, $e_{B+}$, $e_{B+}$, $e_{C+}$ towards zero.

Once such individual correction factors have been established for a particular converter structure, e.g. at a converter design and commissioning stage, there is not normally a need to determine them again. As a result the feedback loop 50 involves minimal computational effort since in each cycle it is simply required to multiply a given limb portion error $e_{A+}$, $e_{A-}$, $e_{B+}$, $e_{B-}$, $e_{C+}$ by the corresponding individual correction factor which has already been determined.

The invention claimed is:

1. A method of controlling a converter including at least one converter limb corresponding to a respective phase of the converter, each converter limb extending between first and second DC terminals and including first and second limb portions separated by an AC terminal, the method comprising:

(a) obtaining a respective AC current demand phase waveform for each converter limb which each converter limb is required to track, and a DC current demand which each converter limb is also required to track;

(b) determining a limb portion current for each limb portion that the limb portion must contribute to track the AC current demand phase waveform and the DC current demand;

(c) providing a limb portion voltage source for each limb portion to achieve the limb portion current determined; and (d) carrying out mathematical optimization to determine one or more optimal limb portion currents and provide optimal limb portion voltage sources, wherein said carrying out mathematical optimization includes creating an equivalent converter configuration which represents a flow of current through the converter and a voltage in the converter, including at least one of mapping possible current flow paths through the converter, mapping the limb portion voltage sources, and mapping an inductive component for each limb portion.

2. The method of controlling a converter according to claim 1 wherein the converter includes a plurality of converter limbs and wherein carrying out mathematical optimization includes a corresponding one of applying a current weighting to a relative current contribution provided by a plurality of limb portions and/or applying a voltage weighting to a relative voltage contribution provided by each limb portion voltage source.

3. The method of controlling a converter according to claim 2 including determining the current weighting and the voltage weighting according to measured operating parameters of the converter.

4. The method of controlling a converter according to claim 2 wherein when controlling the converter under a particular operating condition applying the current weighting and the voltage weighting includes applying a different weighting to at least one limb portion wherein each said limb portion provides a different contribution to the other limb portions.

5. The method of controlling a converter according to claim 1 wherein carrying out mathematical optimization to provide an optimal limb portion voltage source for each limb portion includes reducing any deviation in an actual measured limb portion current of a given limb portion from the limb portion current determined for the given limb portion.

6. The method of controlling a converter according to claim 5 wherein reducing any deviation in an actual measured limb portion current from the limb portion current determined includes calculating an inductive voltage portion for the given limb portion.

7. The method of controlling a converter according to claim 6 further including modifying the calculated inductive voltage portion to drive the actual measured limb portion current to follow the limb portion current determined.

8. The method of controlling a converter according to claim 1 including carrying out mathematical optimization to determine one or more minimum individual limb portion currents that the corresponding limb portion must contribute to track the corresponding required AC current demand phase waveform and the required DC current demand, and/or provide minimum individual limb portion voltage sources to achieve the corresponding determined limb portion current.

9. The method of controlling a converter according to claim 1 including carrying out mathematical optimization only to determine one or more optimal limb portion currents, wherein providing a limb portion voltage source for each limb portion to achieve the corresponding determined limb portion current includes applying a control algorithm to directly establish optimal limb portion voltage sources from each of the corresponding determined limb portion currents.

10. A converter comprising at least one converter limb corresponding to a respective phase of the converter, each converter limb extending between first and second DC terminals and including first and second limb portions separated by an AC terminal, the converter configured to:

(a) obtain a respective AC current demand phase waveform for each converter limb which each converter limb is required to track, and a DC current demand which each converter limb is also required to track;
(b) determine a limb portion current for each limb portion that the limb portion must contribute to track the AC current demand phase waveform and the DC current demand;
(c) provide a limb portion voltage source for each limb portion to achieve the limb portion current determined; and
(d) carry out mathematical optimization to determine one or more optimal limb portion currents and/or provide optimal limb portion voltage sources, the mathematical optimization including creating an equivalent converter configuration representing a flow of current through the converter and a voltage in the converter, including at least one of mapping possible current flow paths through the converter, mapping the limb portion voltage sources, and mapping an inductive component for each limb portion.

\* \* \* \* \*